Reissued Oct. 1, 1940

Re. 21,589

UNITED STATES PATENT OFFICE 21,589

METHOD OF TREATING OAKWOOD FOR THE AGING OF SPIRITUOUS LIQUORS

Ernst T. Krebs and Ernst T. Krebs, Jr.,
San Francisco, Calif.

No Drawing. Original No. 2,070,794, dated February 16, 1937, Serial No. 730,260, June 12, 1934. Application for reissue February 13, 1939, Serial No. 256,252

20 Claims. (Cl. 99—48)

This invention relates to a method of treating oakwood for use in aging of spirituous liquors.

In the manufacture of distilled liquors, such as whiskey, brandy, rum, etc., years are required before the product is ready for the market. The main steps in the manufacture of liquors of this character are fermentation of grains, fruits, etc., to convert the sugar, starches, and so on, to alcohol; removal of the alcohol with its volatile constituents from fermented material by distillation; and finally, aging of the distillate.

The first two steps are completed within two months, more or less, but the aging process, which usually takes place in oak barrels, takes years, as the physical, chemical and biological changes take place slowly and usually occur in a haphazard manner.

Of the several changes that take place during aging, oxidation, aldehydation and esterification of the alcohols are the most essential, and these changes are brought about in the oakwood.

It is applicants' contention that the reason years are required for aging purposes is entirely due to the lack of yeast ferment and enzymes present in the oakwood of the barrels in which aging takes place; for instance, in a fifty gallon barrel there is only about ten square feet of surface presented to the liquid content, hence if this area could be doubled, trebled, and so on, the amount of yeast ferment and enzymes present would be doubled and trebled providing the liquid content would remain the same, and aging would take place in a shorter time.

Applicants have elaborated a method whereby the rectification and aging of spirituous liquors may be completed in a few months, said method employing practically the same physical, chemical and biological phenomena that occur in aging in charred oak barrels during a period of years. Besides expediting the very slow process of aging in oak barrels, applicants' method insures complete esterification of the higher alcohols and a more complete development of the bouquet. By applicants' method there can be produced a uniform and standard product and the desirable constituents such as esters, amino compounds, hydrolyzed tannins, quercoglycerrhyzic acid, etc., may be increased or decreased at will, depending upon the character of product desired.

Applicants have made a number of important discoveries in connection with the rectification and aging of spirituous liquors:

First, that enzymes of the emulsin group play an important part in breaking down certain constituents of the oak by hydrolysis;

Second, that the growth of the crytogamic spores of the oak which produce the amino compounds can be activated and the growth materially faciltated by the action of the enzymes, and further accelerated by the addition of a solution of magnesium chloride and calcium chloride;

Third, that natural yeast ferment present in the acorns activates the growth of the cryptogamic spores in the oakwood and breaks down the tannin compounds and the sugar of the oak; further, that the yeast ferment grows actively in hydro-alcoholic solutions below fifty per cent (50%) and causes partial oxidation and aldehydation of the alcohols, particularly of the ethyl alcohol;

Fourth, that the fruit and flower acids of the oak, such as peach, vanilla, rose, carnation, hyacinth and bitter almond, which form certain esters and produce a finer bouquet, are not fully developed when the oak is germinated with the enzyme and the ferment at the same time; for this reason applicants treat the oak first with the emulsin complex and when the changes in the oak have occurred which develop the fruit and flower acids, the ferment in the form of ground flour from fresh acorns is added to dissociate the tannin compounds further, and to facilitate the esterification and aldehydation of the alcohols;

Fifth, that there is an insufficient amount of enzyme and an inadequate amount of yeast present in the average oak barrel, or like container, to bring about the so-called aging of the liquor in a short period of time, or in fact to fully bring about the desired changes in any length of time, and for this reason enzyme and yeast ferment from other sources are added to facilitate and expedite the so-called aging process and to bring about more completely these desired changes; and Sixth, that by toasting the shavings some of the tannins of the oakwood are dehydrated, this being important as in this form they are more readily acted upon by the emulsin complex.

In describing the process and method of rectification and aging of spirituous liquors the manufacture of bourbon whiskey will be used as an example.

The materials required are:

(1) A good barley-and-corn distillate of about 140 proof as it comes from the still. This is to be made according to the rules governing the mashing and distilling of whiskey by the usual method. This is distilled at a low heat of about 80° C.

into a high ethyl fraction of about 190 proof, which will be referred to as the distillate; the residue in the still, containing amyl, propyl and butyl alcohols, and water, will be referred to as the residue;

(2) Freshly dried wood of the bourbon variety of *Quercus alba* made into chip shavings about the thickness of ordinary paper, these shavings being toasted to a light golden brown color in any suitable type of roaster; also some completely charred shavings. Instead of shavings, sawdust from the oakwood may be used, but shavings are preferable. Raw oak shavings may also be used but if much is used an inferior product is the result;

(3) Fresh ripe acorns of *Quercus alba*, preferably from the bourbon variety, ground to a fine meal;

(4) Emulsin, preferably derived from the genus Prunus or Crucifera, especially mustard;

(5) A solution of magnesium chloride, 1:1000 more or less, dissolved in the residue of the still;

(6) A solution of calcium chloride, 1:10,000 more or less, dissolved in the residue of the still;

(7) A plentiful supply of moderately warm boiled water maintained at a temperature of about 30° C. or 40° C.;

(8) Two drain pots or vats with tight fitting lids for the maceration and percolation of the treated shavings; and (9) Containers for storing the finished product, which should be charred white oak barrels, but earthenware or glass containers may be used.

The operation and process will be as follows:

In a room maintained at a temperature of about 30 or 40° C., more or less, a quantity of freshly toasted oak shavings are placed in an open container, and the shavings are moistened with a sufficient amount of the residue of the still, having dissolved therein equal parts of magnesium chloride and calcium chloride of the approximate strength heretofore specified; the amount of this solution applied being just sufficient to make the shavings moderately moist. Immediately after, or better, twenty-four hours later, emulsion in the amount of ten grains, more or less, for every one gallon in bulk measure of shavings to be treated, is dissolved in some of the residue of the still, or in moderately warm boiled water, and the mixture is poured over the shavings; the quantity employed being sufficient to make the shavings quite moist or dripping. These shavings are stirred up every eight hours, and after forty-eight hours they are placed in drain pot No. 1, and a mixture made from residue of the still and the magnesium chloride and calcium chloride solution is poured over the shavings, the quantity employed being sufficient to cover the shavings, approximately one half of the solution employed being the residue from the still, and approximately half being the solution of calcium and magnesium chloride of the strength specified.

A few hours later, for instance two or three hours after this solution has been added, the solution is drained from the shavings into a container and after forty-eight hours the solution is poured back on the shavings. The solution is again drained from the shavings after a few hours, and forty-eight hours later the drained solution is again poured back over the shavings and left on the shavings from ten to twenty days, or until hydrolyzation by the enzymes is quite complete and the stage of acid formation begins. It may also be stated that during this stage of treatment of the shavings the growth of cryptogamic spores should have been substantial, and that the fruit and flower acids which finally insure the fine bouquet are liberated. The changes that take place are determined by the following reactions: To a half dram of the extract of the shavings add an equal quantity of alcohol, and by adding a drop or two of test solution of ferric chloride this should give a deep olive green, or amber, color without turbidity or precipitate. Furthermore, the extract of the shavings should turn litmus paper a deep red or purple-red color while the paper is still wet, and when boiled with ten times its volume, or more, of Benedict's solution, it should give a fine yellow precipitate and should have a faint aromatic odor.

The acorn is now added and this is accomplished as follows: The extract is drained from the shavings into a container. When the shavings are thoroughly drained, to each gallon by bulk measure of shavings is added a half pound, more or less, of fresh white oak acorn meal. The shavings and meal are thoroughly mixed and tightly packed in the container and after two days, more or less, the drained extract, to which enough distillate is added to bring it up to 60 proof, approximately, is poured back on the mixture of shavings and acorn meal and allowed to remain two to four weeks, more or less. Then the extract is again drained and enough distillate is added to bring the proof up to 100, when it is again poured over the shavings and allowed to remain for ten days, more or less. The whole time the oak shavings are in process the drain pot should be kept tightly closed, except during the time it is being drained. The addition of the acorn to the hydro-alcoholic solution is important, as the ferment therein acts as a catalyst to bring about ester formation and causes a certain amount of aldehydation.

*Drain pot No. 2 or ferment pot*

To one-half the amount of oak shavings used in pot No. 1, add finely ground fresh white acorn meal, the proportion being eight ounces, more or less, to each gallon of bulk shavings, and to this add a sufficient amount of magnesium chloride and calcium chloride solution of the strength previously specified to cause the mixture of shavings and acorn meal to become thoroughly moist. The moistened mixture is then placed in an ordinary drain pot, the bottom of which is lined to a depth of one-half inch to one inch with moistened completely charred oak shavings. After one week, more or less, moderately warm boiled water to which a sufficient amount of distillate has been added to bring the proof up to approximately 60, is added to the shavings, the quantity added being about twice the bulk measure of the shavings in the drain pot. After two to four weeks, more or less, the extract is drained and enough distillate is added to bring it up to 100 proof. This mixture is then poured back on the shavings and allowed to remain for ten days, more or less, the pot being kept tightly closed during the process. The changes which take place in pot No. 2 after the ground acorn meal is added are: an increased amount of cryptogamic growth, which in turn gives an increased production of amino compounds and causes further aldehydation of the ethyl alcohol.

Drain pots Nos. 1 and 2 are now drained and the two portions mixed. The proof is taken, and if it is under 100 it is brought up to this point or a little better by adding a sufficient amount of distillate. This mixture is then poured over the shavings in pot No. 1 and permitted to remain for ten days, more or less. It is then drained off and poured into pot No. 2 and permitted to remain for ten days, more or less. It is then finally drained and put into suitable containers, such as charred white oak barrels, or the like, and placed in an enclosure which is kept at a heat of approximately 43° C. for about sixty days, when the process is completed and the whiskey is ready for use.

The whiskey or product produced may be heavier than the regular whiskey; therefore, if a lighter whiskey is desired, the relative amount of oak shavings to barley-and-corn alcohol and water should be decreased. The whiskey produced by this process or method is also somewhat different in taste, but it is a far better whiskey for either medicinal or beverage purposes than that made by the barrel aging process, as the present process insures complete esterification of the higher alcohols and there is greater aldehydation; also there is a heavier body to the liquor, due to the increased amino compounds.

If a whiskey is desired which is a substantial duplicate of whiskey made by the barrel aging process, the process described under pot No. 2 is omitted. The toasted shavings, with more or less raw shavings, are allowed to soak in a 1:1,000 magnesium chloride solution for one or two hours, more or less, then the shavings are drained and this solution is discarded. When thoroughly drained, they are treated with the magnesium chloride and calcium chloride solutions and the emulsin complex, as described in directions for pot No. 1, and when the extract of the shavings responds to the tests given under the directions for pot No. 1, then enough of this solution is drained off, distillate is added to all or a portion of the drained extract to bring the proof up to 60, more or less, and eight ounces, more or less, of acorn meal is added to each gallon by measure of shavings employed, and the process is followed out as per directions given for pot No. 1.

As another example, that of making compound spirits of juniper (gin) will be given. To a measured amount of pulp obtained by grinding juniper, caraway and fennel seeds, or a similar mixture of berries, seeds, roots, etc., is added a measured quantity of a mixture of equal parts of a solution of magnesium chloride and calcium chloride, the magnesium chloride being dissolved in boiled water in the proportion of 1:1,000 more or less, and the calcium chloride being similarly dissolved in boiled water in the proportion of 1:10,000 more or less. To this solution is added twenty grains, more or less, of emulsin complex preferably derived from the genus Prunus or Crucifera. The emulsin complex is dissolved and the quantity employed is twenty grains to each pound of the ground berries and seeds employed; the quantity of solution containing magnesium chloride, calcium chloride and the dissolved emulsin complex being just sufficient to make the pulp moist. The ground pulp to which the solution is added is kept in a covered earthenware or glass vessel. After five to ten days, more or less, after the mash has started to ferment and has become slightly sour, there is added two ounces, more or less, of fresh acorn meal to each pound of pulp used, and to this is added alcohol of 95% strength, the amount of alcohol employed being one third, more or less, of the solution of magnesium and calcium chloride solution previously used. After standing in the earthen or glass vessel for an additional five to ten days, more or less, enough 95% solution of ethyl alcohol and boiled water is added to bring the solution to 100 proof, and the quantity should be enough to measure four times, more or less, the bulk measure of the ground pulp. After this has been added, the mash is kept at a low temperature, approximately 34° C., and in about two weeks, more or less, the extract is drained off the pulp and it is distilled at a low heat until all the alcohol and esters, with more or less water, have come over. To the distillate thus obtained enough water is added to bring it down to the proof desired when it is ready for use.

The main purpose of this process of treatment is the development of acids which bring about the esterification of the volatile acids of the seeds, berries, roots, etc., employed. It furthermore causes more or less oxidation and aldehydation of the ethyl alcohol, thereby producing a product which is smoother and softer to the taste and to the mucous membrane of the mouth and tongue when comparison is made with similar products ordinarily in use.

From the foregoing it will be noted that oxidation, esterification and aldehydation of the alcohols may take place during the fermentation step, as in the manufacture of gin, or it may take place after fermentation and distillation, as in the case of spirituous liquors, such as whiskey, brandy, rum, etc. The present process makes it possible to produce a palatable, mellow product equivalent to spirituous liquors which have been aged in the ordinary manner over a period of a great many years. It also makes it possible to improve on the desirable constituents, for instance in the manufacture of whiskey; if it is desired to obtain a high ester content the amount of higher alcohols is increased by adding more in proportion of the residue of the still to the high proof ethyl distillate, and insuring complete esterification of the higher alcohols. In the usual run of whiskey the esterified alcohols rarely exceed seven per cent, and this includes ethyl esters. By applicants' method it is possible to substantially double the ester content.

By applicants' method if the desirable qualities of the oak itself are wished to be increased in the whiskey, for instance hydrolized tannins and their compounds, the amino compounds and the quercoglycerrhyzic acid, a relatively larger amount of oak shavings is used in proportion to the spirits or alcohol employed, and the yeast need not be increased. By applicants' method it is also possible to improve the bouquet, that is, the fruit and flower odor esters of the oak, such as peach, banana, vanilla, rose, carnation, hyacinth, bitter almond, and so on, which give whiskey its finer bouquet and which are not fully developed when the oak is germinated at the time the yeast ferment is present. For this reason applicants germinate the oak shavings first with the enzymes or emulsin complex, and when the fruit and flower odor acids have been fully developed the yeast ferment in the form of ground flour of fresh acorns is added, which brings about a further dissociation of the tannin compounds, and in the presence of alcohol it also facilitates esterification and aldehydation of the alcohols.

It is known that oak contains cryptogamic spores which are activated into growth during the process of aging the whiskey. Applicants have found that oakwood contains cryptogamic spores which, with proper emulsins such as are naturally found in oakwood, can be activated into an alga-like growth in the presence of moisture and in proper temperatures. These alga-like or cryptogamic growths are rich in aminosuccinamide. It is highly important that this growth be encouraged as much as possible, as the cryptogamic spores are the source of the amino compounds in whiskey, such as aminosuccinamide, which helps to form the body of the whiskey, and furthermore assists in the aldehydation of the ethyl alcohol. Applicants have promoted the growth of the cryptogamic spores by activating them by the use of the emulsin complex and the ferments of the oak, and catalyzing these enzymes and ferments with the solution of magnesium chloride and calcium chloride. Furthermore, by employing oak in the form of shavings they present a much greater area of oak for the enzymes and ferments to work upon, and thereby supply a greater quantity of cryptogamic spores and make available more tannin compounds, oak sugar, etc., which constituents liberate the fruit and flower odor acids. They also supply enzymes and ferments from exterior sources and as such can add them in quantities much greater than would be possible where these agents are supplied by the oakwood of the container.

While many features of the invention have been more or less specifically described, applicants wish it understood that variations in the mode of treatment may be resorted to and, similarly, where specific materials have been mentioned, others may obviously be substituted within the scope of the appended claims.

Having thus described our invention, what we claim and desire to secure by Letters Patent is:

1. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution containing an emulsin complex.

2. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution containing an emulsin complex derived from the genus Prunus.

3. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution containing an emulsin complex and oak yeast ferments.

4. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution containing an emulsin complex and flour obtained by the grinding of oak acorns containing oak yeast ferments.

5. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution containing oak acorn yeast ferments.

6. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution of magnesium chloride and calcium chloride containing flour obtained by grinding oak acorns.

7. In a method of treating oakwood to produce a prolific growth of cryptogamic spores which promote oxidation, esterification and aldehydation during the aging of spirituous liquors, the steps which consist in reducing the oakwood to a comminuted form, and moistening the comminuted wood with a solution of magnesium chloride and calcium chloride containing oak yeast ferments and emulsin enzymes.

8. In a method of treating oakwood to produce a prolific growth of cryptogamic spores which promote oxidation, esterification and aldehydation during the aging of spirituous liquors, the steps which consist in reducing the oakwood to a comminuted form, and forming acids from the sugar, tannins and tanno compounds of the comminuted wood by breaking down the sugar, the tannins and tanno compounds by the action of emulsin enzymes and oak acorn yeast ferments added to the comminuted wood.

9. In a method of treating oakwood to produce a prolific growth of cryptogamic spores which promote oxidation, esterification and aldehydation during the aging of spirituous liquors, the steps which consist in reducing the oakwood to a comminuted form and activating the growth of cryptogamic spores contained in the comminuted wood by moistening said wood with a solution of magnesium chloride and calcium chloride.

10. In a method of treating oakwood to produce a prolific growth of cryptogamic spores which promote oxidation, esterification and aldehydation during the aging of spirituous liquors, the steps which consist in reducing the oakwood to a comminuted form, toasting the comminuted wood to dehydrate the tannins contained, activating the growth of cryptogamic spores contained in the comminuted wood by moistening the wood with a solution of magnesium chloride and calcium chloride.

11. In a method of treating oakwood to produce a prolific growth of cryptogamic spores which promote oxidation, esterification and aldehydation during the aging of spirituous liquors, the steps which consist in reducing the oakwood to a comminuted form, and hydrolizing the tannin and tanno compounds contained in the comminuted wood by subjecting the wood to the action of an emulsion complex derived from a source other than the oakwood.

12. In a method of treating oakwood to produce a prolific growth of cryptogamic spores which promote oxidation, esterification and aldehydation during the aging of spirituous liquors, the steps which consist in reducing the oakwood to a comminuted form, hydrolizing the tannin and tanno compounds contained in the comminuted wood by subjecting the wood to the action of an emulsin complex derived from a source other than the oakwood, and oak yeast ferment derived from the acorns of oak trees.

13. A method of treating oakwood to produce a prolific growth of cryptogamic spores which promote the formation of amino esters by the action of aminosuccinamide and other amino compounds during the aging of spirituous liquors, which consists in reducing oakwood to a comminuted form, moistening the comminuted wood with water and then subjecting the moistened wood to the action of emulsin enzymes and oak yeast ferments, said enzymes being derived from a source other than the oak, and the yeast ferments from acorns of oak trees.

14. A method of treating oakwood to produce a prolific growth of cryptogamic spores preparatory to employing it for the reception and aging of spirituous liquors, which consists in reducing oakwood to a comminuted form, toasting it to dehydrate the tannin contained, moistening the toasted oak with a solution of chloride of magnesium and chloride of calcium, and adding an emulsion complex to activate the growth of cryptogamic spores in the oak so as to develop the acids which form the fruit and flower odor esters.

15. A method of treating oakwood to produce a prolific growth of cryptogamic spores preparatory to employing it for the reception and aging of spirituous liquors, which consists in reducing oakwood to a comminuted form, toasting it to dehydrate the tannin contained, moistening the toasted oak with a solution of chloride of magnesium, chloride of calcium, and alcohol containing fusel oil and water, and adding an emulsin complex to said solution to activate the growth of cryptogamic spores in the comminuted oak so as to develop the acids which form the fruit and flower esters.

16. A method of treating oakwood to produce a prolific growth of cryptogamic spores preparatory to employing it for the reception and aging of spirituous liquors, which consists in reducing oakwood to a comminuted form, toasting it to dehydrate the tannin contained, moistening the toasted oak with a solution of chloride of magnesium and chloride of calcium, adding an emulsin complex to activate the growth of cryptogamic spores in the oak so as to develop the acids which form the fruit and flower odor esters, and maintaining the toasted comminuted oak in the moistened condition specified until the growth of the cryptogamic spores has been substantially developed and until the fruit and flower odor acids are freely liberated.

17. A method of treating oakwood to produce a prolific growth of cryptogamic spores preparatory to employing it for the aging of spirituous liquors and particularly to increase the amino compounds during the aging of the liquor, which consists in comminuting the oakwood and activating to abundant growth the cryptogamic spores in the wood by subjecting the comminuted wood to the action of emulsin enzymes obtained from yeast, seeds, wood, or of a vegetable origin, in a solution of magnesium chloride and calcium chloride.

18. In a method of treating oakwood to produce a prolific growth of cryptogamic spores which promote oxidation, esterification and aldehydation during the aging of spirituous liquors, the steps which consist in reducing the oakwood to a comminuted form, toasting the comminuted wood, and moistening the comminuted wood with a solution of magnesium chloride.

19. In a method of treating oakwood to produce a prolific growth of cryptogamic spores which promote oxidation, esterification and aldehydation during the aging of spirituous liquors, the steps which consist in reducing the oakwood to a comminuted form, toasting the comminuted wood, and moistening the comminuted wood with a solution of calcium chloride.

20. A method of aging spirituous liquors by accelerating the rate of oxidation, esterification and aldehydation reactions between the several acids and alcohols occurring in spirituous liquors and wood, which consist in treating oakwood with an emulsin complex to produce a profuse growth of cryptogamic spores, said growth being rich in aminosuccinamides and an emulsin complex, and leaching the activated wood with liquor to be aged, until the changed products in the wood are acted upon by the liquor and the desired oxidation, aldehydation and esterification have occurred.

ERNST T. KREBS.
ERNST T. KREBS, Jr.